Oct. 19, 1948.                 W. BEUSCH                    2,451,606
              REMOTE INDICATING PLANT OPERATING ON THE
                     IMPULSE COMPENSATION METHOD
Original Filed April 28, 1942                      2 Sheets-Sheet 1

INVENTOR.
Willi Beusch
BY
Morgan, Finnegan + Durham
ATTORNEYS

Oct. 19, 1948.   W. BEUSCH   2,451,606
REMOTE INDICATING PLANT OPERATING ON THE
IMPULSE COMPENSATION METHOD
Original Filed April 28, 1942   2 Sheets-Sheet 2

INVENTOR.
Willi Beusch
BY
Morgan, Finnegan & Durham
ATTORNEYS.

Patented Oct. 19, 1948

2,451,606

UNITED STATES PATENT OFFICE 2,451,606

REMOTE INDICATING PLANT OPERATING ON THE IMPULSE COMPENSATION METHOD

Willi Beusch, Zug, Switzerland, assignor to Landis & Gyr, A-G., Zug, Switzerland, a body corporate of Switzerland Refiled for abandoned application April 28, 1942, Serial No. 440,788. Divided and this application May 16, 1947, Serial No. 748,610. In Switzerland May 5, 1941

Section 1, Public Law 690, August 8, 1946
Patent expires May 5, 1961

17 Claims. (Cl. 177—351)

The present invention relates to remote metering on the impulse compensation method.

This application is a refile of my abandoned application Serial No. 440,788 filed April 28, 1942.

In the transmission of measured values an apparatus influenced by the compensation system sets up, as a rule, a current which is conveyed to the compensating instrument of the respective system and through the wiring to the receiving set. However, such remote indicating systems working on the compensation method and on that with variation of current suffer from the serious disadvantage of not being able to be applied to all kinds of transmission lines, as the reliability of the transmission is largely dependent on the condition of the line used, that is, insulation defects, resistance of line and leakage. For this reason and despite their remarkable merits these compensation methods are inferior to the impulse method.

However, in order to utilize the advantages of both compensation and impulse methods in the transmission of measured values, it has been suggested to adopt the methods in remote metering in such a way that simultaneously by utilization of the advantages of the impulse method, the above mentioned drawbacks of the compensation method are obviated. Here again, those impulse compensation methods have proven advantageous in which the transmitter-compensation system controls an impulse generating device, so that only upon alteration of the measured value, direct current impulses are given to the receiver, whereby, according to the rising or falling tendency of the measured value, both impulse sequences sent are distinguished from each other as to their signs.

In this remote metering plant operating on the impulse compensation method, however, an indicating or pointer instrument is used for measuring at the transmitting end. Here we have transmission of the deflection of the indicator or pointer instrument. Such indicating instruments, however, possess in general a comparatively low torque, so that they do not absolutely ensure a reliable remote metering. Moreover, the adoption of a pointer instrument further implies a structure of the compensation system which is comparatively intricate and likewise objectionable in service. In this case it is, for instance, necessary to have recourse to a contact balance, which, apart from the compensation device, is also influenced by the pointer instrument. Hence, in order not to charge the pointer instrument too heavily, the contact balance can- not be made sufficiently robust. The contacts of the contact balance, however, are liable to stress or wear on account of frequent switching, so that, if not strong enough, their life will be short. In addition, an objectionably working contact balance affects the testing accuracy.

In most cases the indicating instrument of the transmitter-compensation system will be an electric one. Then, too, the disadvantages entailed by the use of electric pointer instruments will still arise. For instance, in the transmission of electric power a Ferraris-wattmeter is only very reluctantly used on account of its dependability on temperature, its low torque and other detrimental properties. As these watt-meters are not made in quantities their cost is comparatively high.

The invention relates to a remote indicating plant operating on the impulse compensation method, in which a transmitter-compensation system controls an impulse generating device in such a way that impulses are emitted to the receiving end merely upon alteration of the measured value, whereby, according to the rising or falling tendency of the value the two emitted impulse sequences are distinguished from each other as to their kind. According to the invention the mentioned drawbacks of similar remote metering plants are obviated by the fact that a device of the transmitter compensation system responsive to the difference of the speeds of the rotating measuring and compensating instrument controls is provided, in addition to the apparatus setting up a compensation current for the compensation device, and an impulse generating appliance or device producing the two distinguished impulse sequences; further, that according to the direction of the speed difference of the differential arrangement, each time the one or the other impulse sequence transmitted acts upon a receiver differential arrangement influencing the device for indicating or integrating the transmitted rate of speed.

Consequently, for the measuring device of the transmitter compensation system a rotating and not a pointer type metering device is adopted. Rotating metering instruments, however, especially if electricity meters are used, are of outstanding workmanship, extremely well tested in practice and made in large quantities. Therefore they ensure in every respect adequate reliability, testing accuracy and economy. Thus the impulse compensation methods utilizing a rotating transmitter compensation system are not affected by the drawbacks of similar methods hitherto known.

In one form of embodiment, the differential arrangement of the transmitter compensation system may comprise a differential gear whose sun wheels are driven the opposite way by the rotary metering or compensation device and whose planet gear axis drives the setting apparatus for the compensation current and the impulse generating appliance. Thereby the impulses of both sequences produced by the impulse generating appliance can be either alternating or direct current impulses distinguished from each other by their frequency and polarity, respectively.

In the accompanying drawings one form of embodiment of the invention is illustrated. It is a remote metering plant by means of which the output of an electric distribution network is to be transmitted over a distance.

Figure 1:
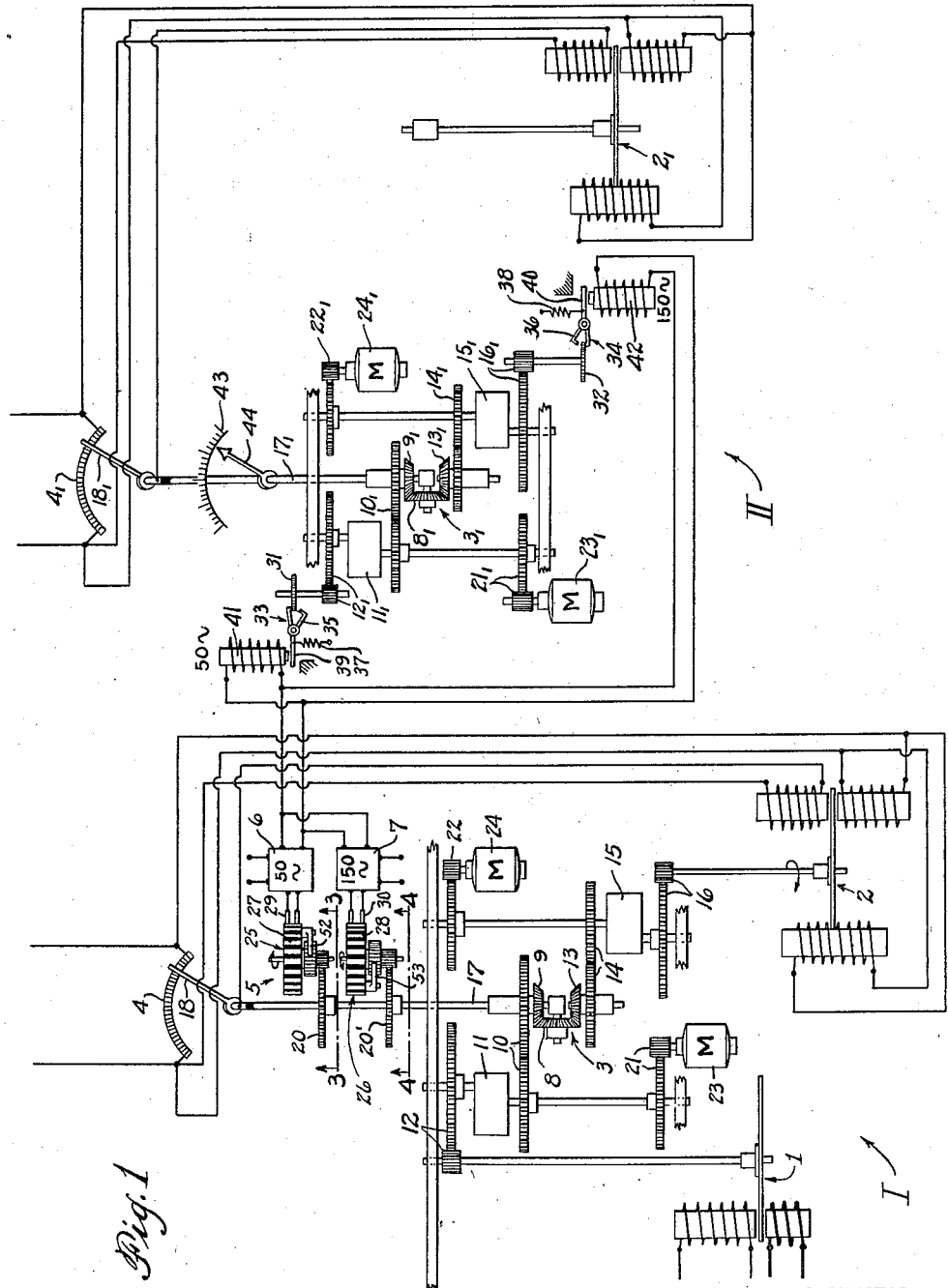
Fig. 1 is a diagrammatic showing of such a plant.

The transmitting end I comprises: one electricity meter 1 serving as indicating instrument, one electricity meter 2 serving as compensation device, one differential arrangement 3, one potentiometer 4, one impulse generating appliance 5 and two alternating current sources 6, 7.

The differential gearing of the differential arrangement 3 is connected with its sun wheel 9 over gearing 10, control device 11, gearing 12 with the indicating meter 1, and with its sun wheel 13 over gearing 14, control device 15, gearing 16 with the compensation meter 2, as well as with its planet gear 8 to the rotary shaft 17 operating a rotary contact 18 of the potentiometer 4. This shaft 17 is also connected through gearing 20, 20' with the transmitters of the impulse generating appliance 5, as hereinafter described. Each of the gearings 10 and 14 of the differential arrangement 3 are in addition coupled through gearing 21 and 22, to servo-motors 23, 24, respectively.

Figure 2:
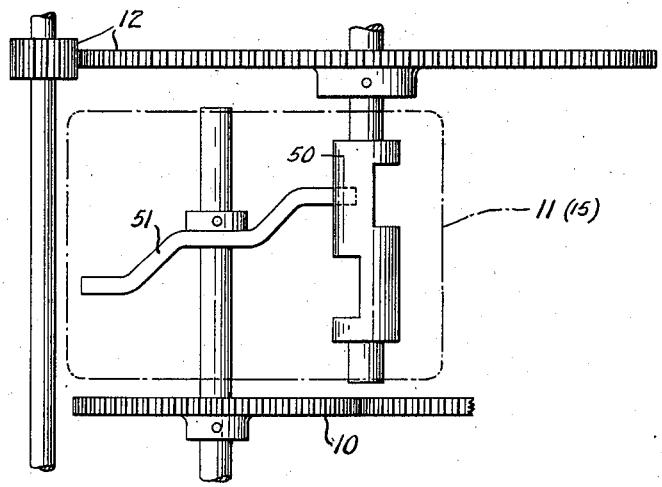
Fig. 2 is a plan view of the details of the control device 11 shown in Fig. 1.

The control devices 11, 15 which serve the purpose of releasing the meters 1, 2 from driving work for the differential arrangement 3 may be designed as synchronous or lagging control devices. Should, for example, a time-lag indicating device be adopted for the control device 11, it follows that if a part of the control device 11 driven by meter 1 is adjusted by an amount corresponding to the rate of speed, then a part of control device 11 driven by servo-motor 23 is regulated by an equal amount, being transmitted over gearing 10 and sun wheel 9 to the planet gear shaft 17. The control device 11 is thereby so constructed that the servo-motor 23 exerts practically no reaction moment on meter 1. In Fig. 2 there is illustrated such a time-lag control device wherein it will be apparent that driving movements of the meter 1 actuating gearing 12 and rotating the interrupted cylindrical member 50 will be duplicated on the gearing 10 by motor 23 through the control of the bent double ended arm 51 cooperating with cylindrical member 50. It will be understood that the control device 11 shown in detail in Fig. 2 is duplicated in devices 15, 11₁ and 15₁ shown in Fig. 1. The meter 1 thus merely serves for control, while motor 23, steered by control device 11, assumes the drive of the differential arrangement 3. The drive of the differential arrangement 3 by motors 23 and 24 is effected in such a way that the sun wheels 9, 13 of the differential gear 8 are caused to rotate in opposite directions. Thus, according to the greater speed of one or the other of the sun wheels 9 and 13, the planet wheel shaft 17 of the differential gear 8 is moved in the one or the other direction.

Figure 3:
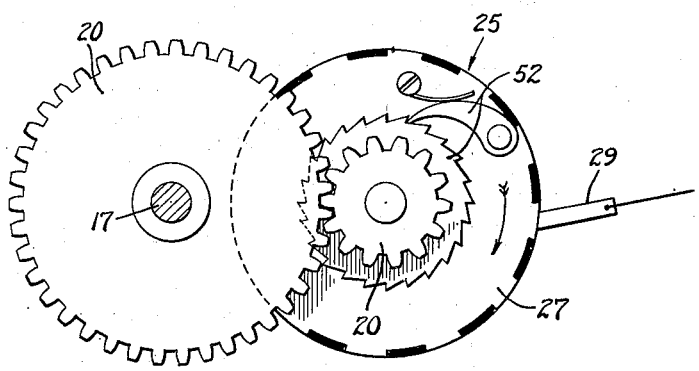
Fig. 3 is a side elevation of certain of the mechanism shown in Fig. 1 as viewed along line 3—3 of Fig. 1; and, Fig. 4 is a side elevation of certain of the mechanism shown in Fig. 1 as viewed along line 4—4 of Fig. 1.
Figure 4:
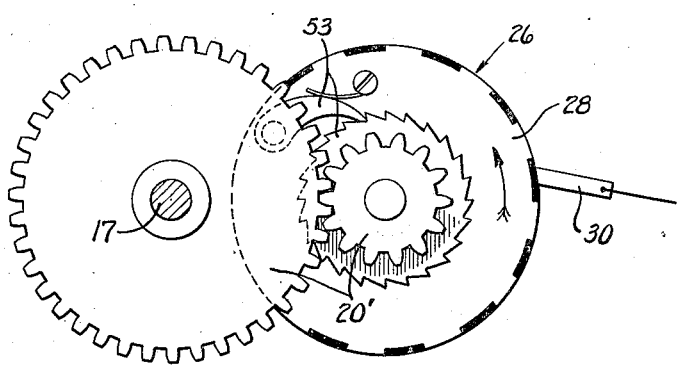

The impulse generating appliance 5 consists of two make and break impulse transmitters 25 and 26. The impulse transmitter 25 comprises a collector 27 in the form of a commutator wheel or drive and a pair of brushes 29 connected therewith and conductively connected to the alternating current source 6. The impulse transmitter 26 comprises a similar collector 28 and a pair of brushes 30 conductively connected to the alternating current source 7. The impulse generating appliance 5 is so designed that in one rotary direction of the planet wheel shaft 17 of the differential arrangement 3 the impulse transmitter 25, and in the other rotary direction of the planet wheel shaft 17 the impulse transmitter 26, comes into action. These actions are permitted by reverse pawl and ratchet connections 52 and 53, shown in detail in Figs. 3 and 4 of the drawings, between the axle 17 and gear sets 20 and 20', and the collectors 27 and 28. Thereby 50 periodic impulses of alternating current are emitted in one case and 150 in the other. In the drawing, arrows above the collectors 27, 28 indicate the rotary direction in which the impulse transmitters 25, 26, respectively, become effective.

On the receiving end II, a differential arrangement is also provided, comprising likewise elements and gear parts as shown in differential arrangement 3 of the transmitting side. Therefore the parts identical with those of the transmitting set are designated by the corresponding reference numerals marked with additional index 1 for differentiation.

Further, each of the gears 12₁ and 16₁ is coupled to an escapement wheel 31 and 32 of a blocking mechanism 33 and 34, whose release member 35 and 36 is connected with an armature 39 and 40, of an impulse relay 41 and 42, respectively, each armature being under tension of a spring 37 and 38, respectively. Both impulse relays 41 and 42 are designed as frequency relays, whereby the impulse relay 41 responds to a frequency of 50 cycles per second and the impulse relay 42 to a frequency of 150 cycles per second.

The planet wheel shaft 17₁ is connected in addition to rotary contact 18₁ of potentiometer 4₁ with a movable pointer 44 arranged to operate over a scale 43. The current set up by potentiometer 4₁ is conveyed to an electricity meter 2₁ independent of variations in the voltage.

Upon alteration of the rate of speed, for example, with decreasing output, the running of meter 1 varies. Then the control device 11 influenced by meter 1 will steer the servo-motor 23 so that the speed transferred to sun wheel 9 of the differential gear 8 remains behind the speed of sun wheel 13 derived from compensation meter 2, and the previously arrested planet wheel shaft 17 is now caused to rotate in one direction which corresponds to the rotary direction of compensation meter 2.

If it is presumed that the Ferraris disc of compensation meter 2 revolves in the direction indicated by the arrow, then the turning contact 18 of potentiometer 4 is adjusted to the left and the impulse transmitter 25 set in action. The adjustment to the left of the turning contact 18 of potentiometer 4 brings about a lessening of current supply to compensation meter 2 and hence a reduction of its velocity.

As the impulse transmitter 25 has now come into action, alternating current impulses of the frequency 50 are transmitted to the receiving end II. Consequently these impulses will bring to engagement the impulse relay 41 turned for an alternating current of 50 cycles. Each impulse effects a short release of the escapement wheel 31 of the blocking mechanism 33, so that through control device 11₁ the servo-motor 23₁ causes the escapement wheel 31 to move further by one tooth, and with it the sun wheel 9₁ of differential gear 8₁ by a corresponding amount. This amount of motion is then transferred to the planet wheel shaft 17₁, whereby again the pointer 44 and hence the rotary contact 18₁ of potentiometer 4₁ is accordingly adjusted to the left. The pointer then indicates the value measured by meter 1 at the transmitting end I, while meter 2₁ of the receiving end II runs more slowly due to the decreased current set up by potentiometer 4₁, thus likewise integrating the transmitted value in a clockwork.

The adjustment of pointer 44 and rotary contacts 18 and 18₁ of potentiometers 4 and 4₁ of the transmitting and receiving sets respectively proceeds until the speed of the compensation meter 2 of the transmitter compensation systems equals that of meter 1. Both sun wheels 9, 13 of the differential gear 8 of the transmitter differential arrangement attain the same speed, so that the planet wheel shaft 17 again comes at rest. Shortly after the last impulse also the transmission of the motion controlled by blocking mechanism 33 on indicator 44 and rotary contact 18₁ of potentiometer 4, is effected. By this an indication as well as an integration of the transmitted value is accomplished at the receiving end.

The retardation of the indications of the receiving instrument is very slight, i. e. only fractions of a second. The impulse generating appliance 5 operates preferably so that on altering the rate of speed by 1% an impulse is given and with 100% load 100 impulses are sent. In the present case such an impulse frequency is fully satisfactory for adequate accurate remote indication.

With rising power measured by meter 1 at the transmitting end the performance is similar. In this case the sun wheel 9 of differential arrangement 8 driven by meter 1 will rotate more rapidly than the sun wheel 13 controlled by compensation meter 2. Consequently the rotary contact 18 of the transmitter potentiometer 4 will now be adjusted in the opposite way to that described above, and the impulse transmitter 26 will continue to effectuate the generation and emission of alternating current impulses of the frequency 150. Thus, at the receiving end II, the frequency relay 42 tuned to the frequency of 150 cycles per second is now excited and hence the indicator 44 with turning contact 18₁ of the receiver potentiometer 4₁ adjusted the opposite way to that described above, i. e. to the right. The higher value is then indicated by pointer 44 and integrated by electricity meter 2₁.

In order to obviate errors which may possibly arise by disturbing impulses, the meter 1 can be disconnected by a breaker, preferably controlled by a time-switch. In this case the compensation meter 2 then running quite alone brings the turning contact of potentiometer 4 to the zero position. In a similar way the meter 2₁ provides of course for the resetting to zero of the rotary contact of potentiometer 4 in the receiving set. After correction the whole plant comes to a standstill. On switching on meter 1 the remote indication of the values to be transmitted is resumed normally. According to given circumstances said correction of the plant can be carried out once or several times a day.

Evidently, instead of an electric power also any other electric value can be transferred over a distance. It is, for instance, likewise possible to transmit the apparent power of a distribution network. Hereby the suitable procedure is such that the impulses corresponding to both the active and reactive components are separately sent from the transmitter to the receiving end each by means of a transmitter compensation system and each actuating in the receiving set a differential arrangement whose planet wheel shafts act upon potentiometers. The currents set up by these potentiometers are then conveyed to meters being independent of changes in the voltage, said meters driving a clockwork integrating device connected gear arrangement that forms the geometrical sum of the active and reactive component. To this end the well-known differential arrangements with various gear ratios and overhauling gears can be employed. Then, at the receiving end both the active and reactive as well as the apparent consumption can be recorded.

It is understood that with the remote indicating plant according to the invention, the apparent consumption of several remote measuring places can be transmitted to the receiving place and integrated there. Thereby the impulses corresponding to the active component of each transmitting set act upon sun wheels of a summation differential arrangement comprising several differential gears, and similarly the impulses corresponding to the reactive component of each transmitting set act upon an additional summation differential arrangement. To constitute the integral apparent consumption both summation differential gear arrangements act then upon the following measuring devices, as in the case of single indication.

The new remote indicating plant lends itself equally well for integration of other service values. It allows plainly the transmission of all kinds of measured values, physical and mechanical ones as well. If thereby the measured value can be brought for direct action on the rotating meter, it is necessary to transform them in any suitable manner.

It is believed that a more detailed description of the whole combination comprising my invention is not necessary for those familiar with the particular art, suffice it to say that the specified structure illustrated may be departed from in a number of instances without in any way affecting the principle embodied in my invention. So the potentiometer may be replaced by another element affecting the condition of a current circuit, for instance by an induction regulator.

Other modes of applying the principle of my invention may be employed instead of the one explained, changes being made as regards the mechanism herein disclosed, provided the means stated by any of the following claims or the equivalent of such stated means be employed.

What I claim is:

1. In a remote indicating system between a transmitter station and a receiver station operating on the impulse compensation principle, a rotating measuring instrument and a rotating compensating instrument at the transmitting station, a device responsive to the difference in speed between said instruments, an impulse generating unit controlled by said device for producing two distinct impulse sequences of different kind dependent upon the preponderant speed of the respective one of said instruments, means operated by said device for controlling the compensation current for said compensating instrument, an indicating arrangement at the receiver station, and a second device at the receiver station controlled by the impulse sequences transmitted thereto for influencing said indicating arrangement.

2. In a remote indicating system between a transmitter station and a receiver station operating on the impulse compensation principle, a rotating measuring instrument and a rotating compensating instrument at the transmitting station, a differential arrangement responsive to the difference in speed between said instruments, an impulse generating unit controlled by said arrangement for producing two distinct impulse sequences of different kind dependent upon the direction of speed difference of said differential arrangement, means operated by said differential arrangement for controlling the compensation current for said compensating instrument, indicating apparatus at the receiver station, and a second differential arrangement at the receiver station controlled by the impulse sequences transmitted thereto for influencing said indicating apparatus.

3. In a remote indicating system between a transmitter station and a receiver station operating on the impulse compensation principle, a rotating measuring instrument and a rotating compensating instrument at the transmitting station, a differential arrangement responsive to the difference in speed between said instruments comprising a differential gear having sun wheels driven in opposite directions by said measuring instrument and compensating instrument, and a planet wheel operated by said sun wheels, an impulse generating unit controlled by said arrangement for producing two distinct impulse sequences of different kind dependent upon the direction of movement of said planet wheel, a setting device operated by the movement of said planet wheel for controlling the compensation current for said compensating instrument, indicating apparatus at the receiver station, and a second differential arrangement at the receiver station controlled by the impulse sequences transmitted thereto for influencing said indicating apparatus.

4. The combination set forth in claim 3 wherein said first-mentioned differential arrangement comprises a differential gear having sun wheels driven in opposite directions respectively by servo-motors and control devices for said servo-motors respectively controlled by said measuring instrument and compensating instrument.

5. The combination set forth in claim 3 wherein said setting device comprises a potentiometer governing the current supply to said compensating instrument.

6. The combination set forth in claim 3 wherein the two impulse sequences produced by the impulse generating unit are alternating current impulses which are distinguished from each other in their frequency.

7. In a remote indicating system between a transmitter station and a receiver station operating on the impulse compensation principle, a rotating measuring instrument and a rotating compensating instrument at the transmitting station, a differential arrangement responsive to the difference in speed between said instruments, an impulse generating unit controlled by said arrangement for producing two distinct impulse sequences of different kind dependent upon the direction of speed difference of said differential arrangement, means operated by the said differential arrangement for controlling the compensation current for said compensating instrument, indicating apparatus at the receiver station, a second differential arrangement at the receiver station controlled by the impulse sequences transmitted thereto for influencing said indicating apparatus comprising a differential gear having one sun wheel driven in one direction by an operating mechanism influenced by the impulse sequences of one kind, another sun wheel driven in the opposite direction by an operating mechanism influenced by the impulse sequences of the other kind, and a planet wheel operated by said sun wheels, and a setting device controlled by said planet wheel for affecting said indicating apparatus.

8. The combination set forth in claim 7 wherein said operating mechanisms for said sun wheels comprise servo-motors and impulse relays for controlling said servo-motors.

9. The combination set forth in claim 7 wherein said operating mechanisms for said sun wheels comprise servo-motors and impulse relays for controlling said servo-motors functioning as release relays.

10. The combination set forth in claim 3 wherein said indicating apparatus at the receiver station comprises a scale and said setting apparatus controlled by said planet wheel drives a pointer cooperating with said scale.

11. The combination set forth in claim 3 wherein said indicating apparatus at the receiver station comprises a metering instrument, and a potentiometer connected to said metering instrument adapted to be adjusted by said setting device.

12. The combination set forth in claim 3 wherein said first-mentioned differential arrangement is driven by servo-motors, and control devices for said servo-motors influenced by said measuring instrument and compensating instrument.

13. The combination set forth in claim 7 wherein said operating mechanisms for said sun wheels comprise servo-motors, impulse relays for controlling said servo-motors and additional control devices between said impulse relays and said servo-motors.

14. In a remote indicating system for an electric power transmission installation, between a transmitter station and a receiver station operating on the impulse compensation principle, a rotating electrical measuring instrument and a rotating electrical compensating instrument at the transmitting station, said compensating instrument being independent of voltage changes, a differential arrangement responsive to the difference in speed between said instruments, an impulse generating unit controlled by said arrangement for producing two distinct impulse sequences of different kind dependent upon the preponderant speed of the respective one of said instruments, said differential arrangement in addition controlling the compensation current for said compensating instrument, electrical metering apparatus at the receiver station independent of voltage changes, and a second differential arrangement at the receiver station controlled by the impulse sequences transmitted thereto for influencing said electrical metering apparatus.

15. In a remote indicating system between a transmitter station and a receiver station operating on the impulse compensation principle, a set of instruments comprising a rotating measuring instrument and a rotating compensating instrument at the transmitting station, a differential arrangement for said set of instruments responsive to the difference in speed between the respective instruments, an impulse generating unit controlled by said arrangement for producing two distinct impulse sequences of different kind dependent upon the direction of speed difference of each of said differential arrangements, said differential arrangements in addition controlling the compensation current for said compensating instruments, a common differential arrangement controlled by the impulses being transmitted, indicating and integrating apparatus at the receiver station and another differential arrangement at the receiver station controlled by the integrated impulse sequences transmitted thereto for influencing said indicating and integrating apparatus.

16. The combination set forth in claim 15 wherein said common differential arrangement comprises a differential gear combination which integrates for itself both impulse sequences of the set of transmitter instruments, transferring these impulse summations in opposite direction to the indicating and integrating apparatus at the receiver station.

17. In a remote indicating system for an electric power transmission installation, between a transmitter station and a receiver station operating on the impulse compensation principle, a set of instruments comprising a rotating electrical measuring instrument and a rotating electrical compensating instrument at the transmitting station for each of the active and reactive components of current, said compensating instruments being independent of voltage changes, a differential arrangement for said set of instruments responsive to the difference in speed between said instruments, an impulse generating unit associated with said set of instruments controlled by said arrangement for producing two distinct impulse sequences of different kind dependent upon the preponderant speed of the respective one of said instruments, each of said differential arrangements in addition controlling the compensation current for the respective compensating instruments, electrical meters at the receiver station independent of voltage changes corresponding to each set of instruments at the transmitter station, one for measuring the active component and the other the reactive component of the current, a differential arrangement at the receiver station controlled by the respective impulse sequences transmitted thereto for influencing said electrical meters, and an integrating mechanism at the receiver station for indicating the geometrical sum of the active and reactive components of current.

WILLI BEUSCH.

REFERENCES CITED

The following references are of record in the file of this patent:

FOREIGN PATENTS

| Number | Country | Date |
|---|---|---|
| 557,168 | Great Britain | Nov. 8, 1943 |